(12) United States Patent
Toste et al.

(10) Patent No.: US 6,824,318 B2
(45) Date of Patent: *Nov. 30, 2004

(54) CAMERA ENCLOSURE WALL MOUNT

(75) Inventors: David L. A. Toste, Fresno, CA (US);
Joshua S. Houser, Fresno, CA (US);
Terrence Traser, Clovis, CA (US)

(73) Assignee: Pelco, Clovis, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/654,837

(22) Filed: Sep. 3, 2003

(65) Prior Publication Data

US 2004/0096209 A1 May 20, 2004

Related U.S. Application Data

(63) Continuation of application No. 10/298,023, filed on Nov. 15, 2002, now Pat. No. 6,634,804.

(51) Int. Cl.[7] .............................................. G03B 17/00
(52) U.S. Cl. ....................................................... 396/427
(58) Field of Search ................................. 396/427, 419; 348/143, 373; 248/181.1

(56) References Cited

U.S. PATENT DOCUMENTS

| | | | |
|---|---|---|---|
| 3,568,583 A | | 3/1971 | Horberg, Jr. et al. |
| 3,877,041 A | * | 4/1975 | Graeter et al. ............... 396/351 |
| 4,320,949 A | | 3/1982 | Pagano |
| 4,736,218 A | | 4/1988 | Kutman |
| 4,797,736 A | * | 1/1989 | Kloots et al. ................ 348/370 |
| 4,974,088 A | | 11/1990 | Sasaki |
| D325,212 S | | 4/1992 | Elberbaum |
| 5,115,263 A | | 5/1992 | Bernhardt et al. |
| 5,214,245 A | | 5/1993 | Bernhardt et al. |
| 5,224,675 A | | 7/1993 | Ellenberger et al. |
| D340,940 S | | 11/1993 | Ellenberger et al. |
| D349,714 S | | 8/1994 | Hasegawa |
| 5,394,208 A | | 2/1995 | Campbell |
| 5,649,256 A | | 7/1997 | Wen |
| 5,689,304 A | | 11/1997 | Jones et al. |
| 5,790,910 A | | 8/1998 | Haskin |
| D398,319 S | | 9/1998 | Chen |
| 5,818,519 A | | 10/1998 | Wren |
| D403,340 S | | 12/1998 | Arbuckle |
| 5,844,985 A | * | 12/1998 | Kulberg et al. ......... 379/433.13 |
| 5,850,579 A | | 12/1998 | Melby et al. |
| D424,087 S | | 5/2000 | Frick et al. |
| 6,061,087 A | | 5/2000 | Schieltz et al. |
| 6,203,216 B1 | | 3/2001 | Koizumi |
| D446,236 S | | 8/2001 | Chen |
| D446,534 S | | 8/2001 | Zimmer |
| 6,354,749 B1 | | 3/2002 | Pfaffenberger, II |
| 6,375,369 B1 | | 4/2002 | Schneider et al. |
| 6,634,804 B1 | * | 10/2003 | Toste et al. .................. 396/427 |
| 6,639,623 B2 | * | 10/2003 | Howell et al. ................. 348/61 |

* cited by examiner

Primary Examiner—Christopher E Mahoney
(74) Attorney, Agent, or Firm—Mark D. Miller

(57) ABSTRACT

The present invention is an adjustable aesthetically pleasing support structure for a large surveillance camera that is resistant to water and moisture penetration and protects the wires connected to the camera while providing a wide range of adjustable viewing angles for the attached camera.

18 Claims, 8 Drawing Sheets

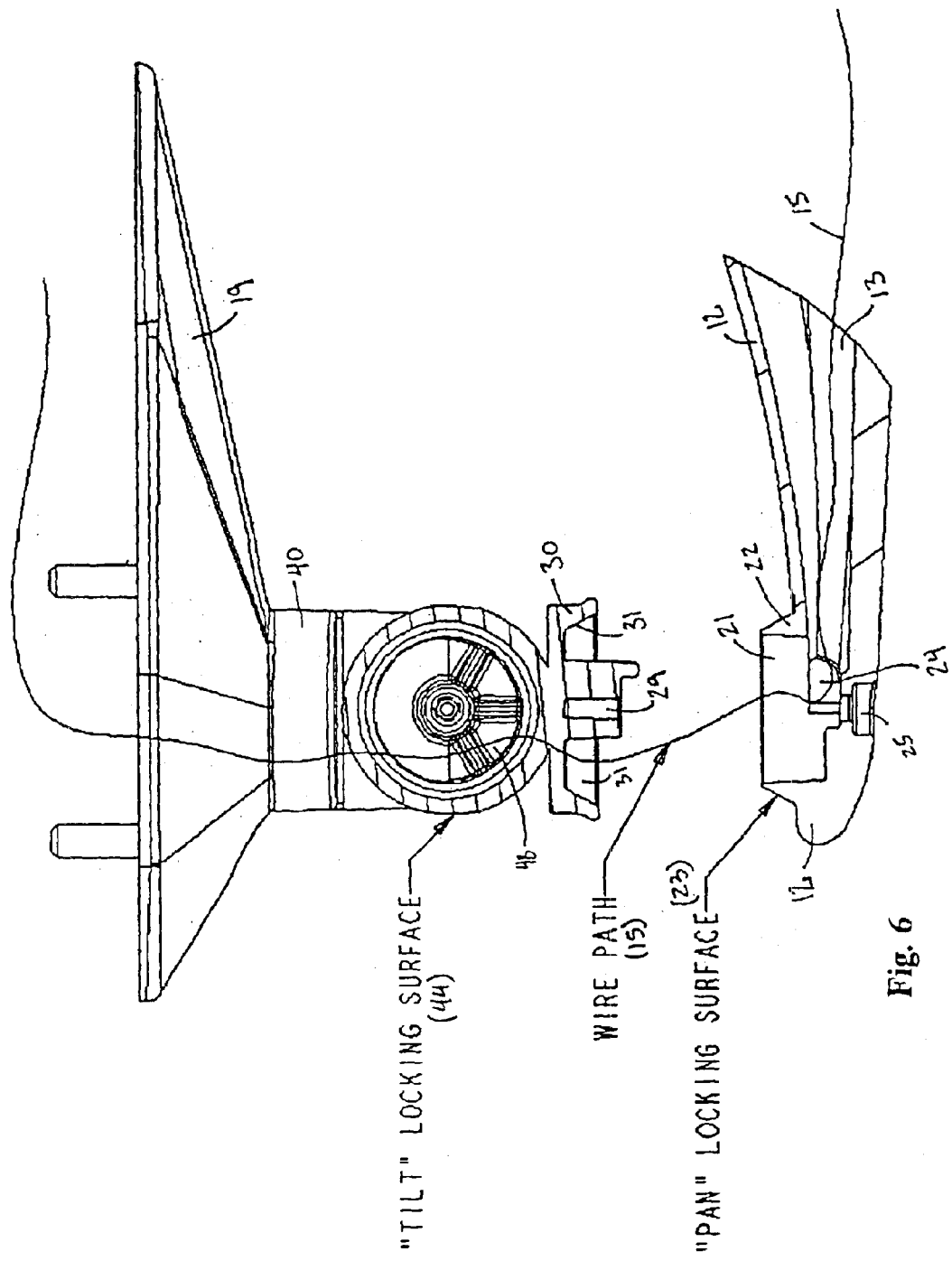

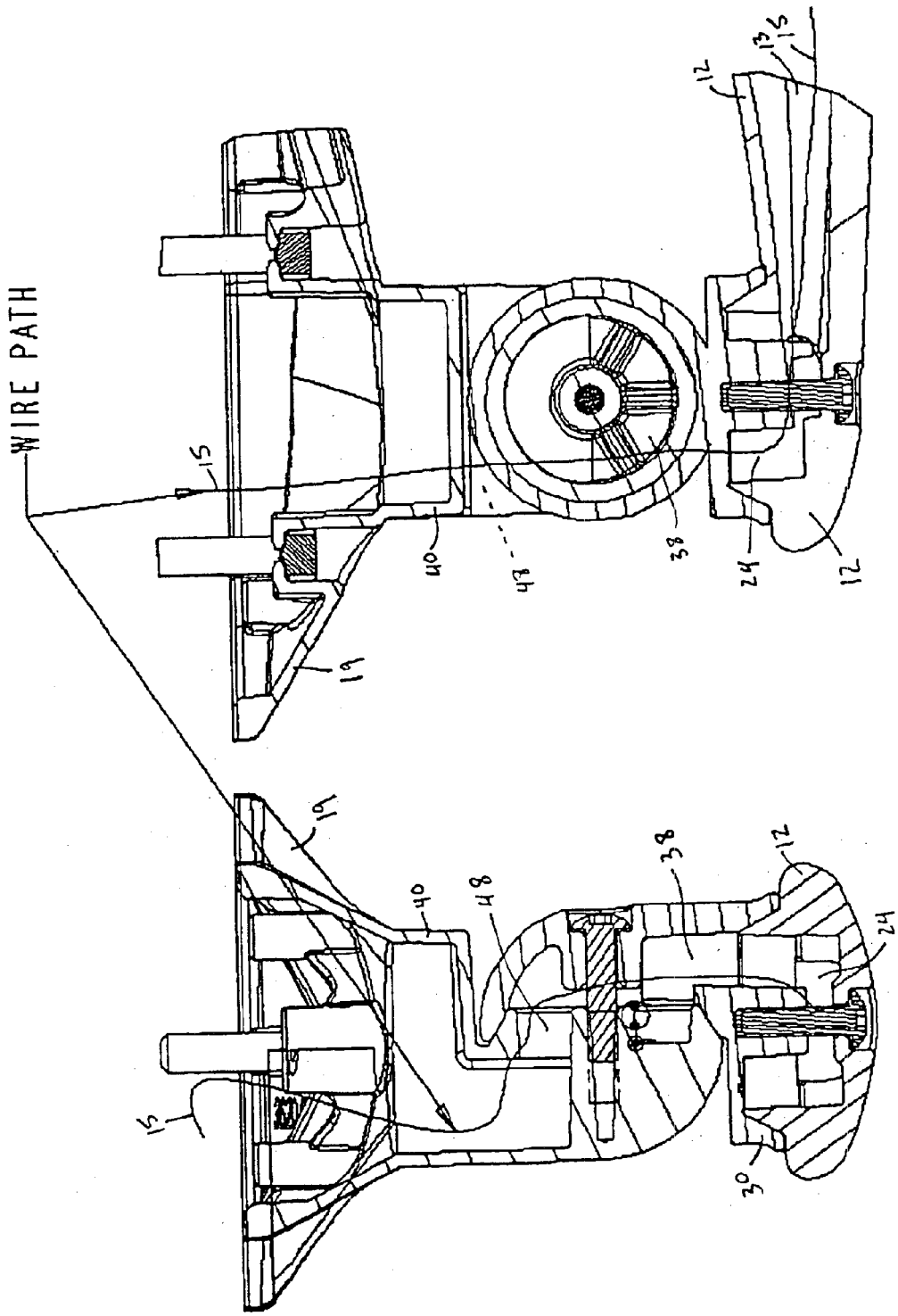

CAMERA ENCLOSURE WALL MOUNT

This application claims the benefit and continuation of utility application Ser. No. 10/298,023 filed on Nov. 15, 2002, now U.S. Pat. No. 6,634,804.

BACKGROUND OF THE INVENTION

1. Field of the Invention

The present invention relates to surveillance camera systems, and more particularly to an adjustable surface-mountable support for a surveillance camera that provides for a wide range of adjustability while providing protection for the wires passing through the interior thereof.

2. Description of the Prior Art

The use of surveillance cameras has become increasingly widespread. Often, such cameras must be mounted outdoors where they may be subjected to dramatic temperature, moisture and other climactic changes, as well as potential vandalism. Accordingly, different enclosures and support structures have been developed for surveillance cameras. Unfortunately, the designs of many existing support structures allow the wires leading from the camera to be exposed to the outside where they can be damaged or cut. In addition, many existing camera supports cannot support large cameras and provide only a very limited range of adjustment of the position of the attached camera.

It is therefore desirable to provide an adjustable support structure for a large surveillance camera that is resistant to water and moisture penetration and protects the wires connected to the camera while providing a wide range of adjustable viewing angles for the attached camera.

SUMMARY OF THE INVENTION

The present invention provides a superior sealed aesthetically pleasing surveillance camera support structure that maintains the camera wires on the inside, and provides wide range of positioning and viewing angles even when a large or heavy camera is attached. The invention includes a surface-mountable base and a reinforced outwardly-extending support arm. A specially adapted rotatable swivel mechanism is attached at the end of the arm that is capable of being rotated (the panning or scanning angle) through a horizontal arc of as much as approximately 300°. Adjacent to the swivel is another rotatable joint that is capable of moving up and down (the tilt angle) through an arc of as much as approximately 180°. A camera support platform is attached above the rotatable joint.

The support structure is designed so that once the viewing angle for the camera is selected, the swivel and joint are tightened so that the camera remains pointing at this fixed angle. In order to accommodate larger cameras, significant bearing surfaces are provided in the swivel and joint so as to maximize the frictional resistance to movement. At the same time, sufficient space is provided inside both the swivel and joint to allow wires leading from the camera to pass through. Wires exiting the camera pass through the support platform, rotatable joint, swivel, arm and base into an opening provided in the surface behind where the mount is attached.

The present invention also allows considerable adjustability and flexibility with respect to establishing and changing the viewing angle of the attached camera, while keeping the sensitive internal components shielded from outside contaminants. Establishing and changing the viewing angle is accomplished by loosening the tightening screws of the swivel and/or joint, moving the camera to the desired angle, and then retightening these screws.

It is therefore a primary object of the present invention to provide an adjustable surface-mountable support apparatus for a surveillance camera that is resistant to water and moisture penetration and protects the wires connected to the camera while providing a wide range of adjustable viewing angles for the attached camera.

It is also an important object of the present invention to provide an adjustable surface-mountable surveillance camera support that may be horizontally adjusted through as much as 300° and vertically adjusted through as much as 180°.

It is also an important object of the present invention to provide an adjustable surface-mountable surveillance camera support that is capable of being adjusted through a wide range of possible viewing angles and then firmly secured in a selected fixed position.

It is also an important object of the present invention to provide an adjustable surface-mountable surveillance camera support that is capable of supporting a large, heavy surveillance camera in a fixed position.

It is also an object of the present invention to provide an aesthetically pleasing yet durable and reliable support structure for a surveillance camera.

Additional objects of the invention will be apparent from the detailed descriptions and the claims herein.

BRIEF DESCRIPTION OF THE DRAWINGS

FIG. 6 is a partially exploded sectional view of the invention along line B—B of FIG. 1

FIG. 7 is a sectional view of the assembled invention along line A—A of FIG. 1 showing the wire path.

FIG. 8 is a sectional view of the assembled invention along line B—B of FIG. 1 showing the wire path.

DETAILED DESCRIPTION OF THE PREFERRED EMBODIMENTS

Figure 1:
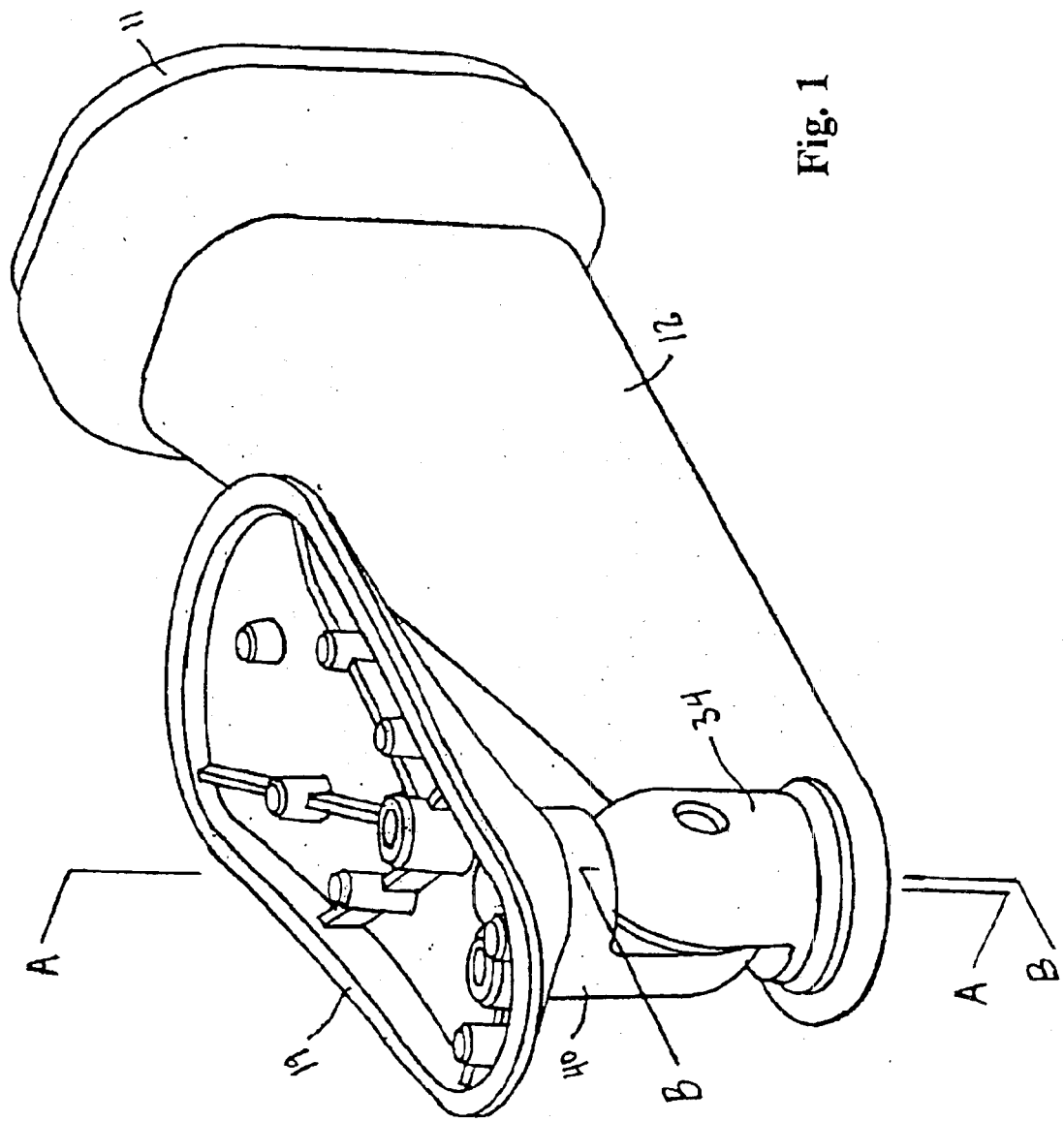
FIG. 1 is a top perspective exterior view of the present invention.
Figure 2:
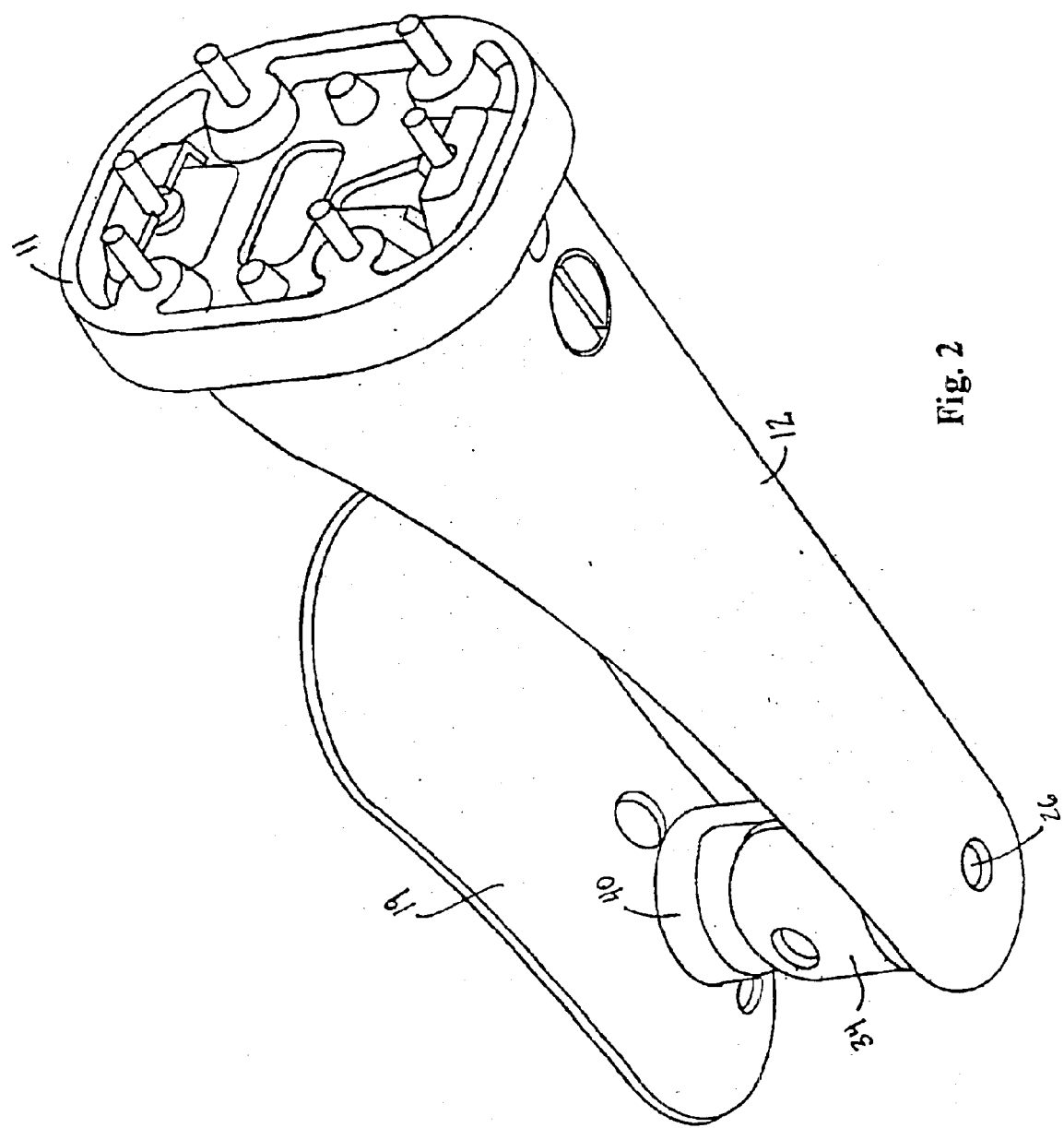
FIG. 2 is a bottom perspective exterior view of the present invention.

Referring to the drawings wherein like reference characters designate like or corresponding parts throughout the several views, and referring particularly to FIGS. 1 and 2, it is seen that the support structure of the present invention includes a surface-mountable base or plate 11 for attachment to a flat surface such as a wall, ceiling, soffit or shelf; a hollow reinforced arm 12 fixedly attachable to mounting plate 11; a rotatable member 34 for adjustable engagement with a socket 21 at the end of arm 12; and upper journal member 40 for adjustable engagement with the rotatable member 34; and an upper platform 19 for holding the surveillance camera. Hollow or open areas are provided in side each of these members to allow wires 15 to be threaded through on the inside from the mounting surface to the camera Referring to FIGS. 3–5, it is seen that a socket 21 is provided at the end of arm 12 for engagement with a mating structure 30 on a separate rotatable member 34. Socket 12 includes an upwardly extending annular lip 22 having an outer angled bearing surface 23 as shown in FIG. 4. A through hole 25 is provided in the center of socket 21 for receiving an attachment means such as a screw 26. An open interior area 24 is provided at the bottom of socket 21 that is in communication with the hollow interior 13 of arm 12 through which one or more wires 15 may be threaded. See FIGS. 6–8 for wiring.

Figure 4:
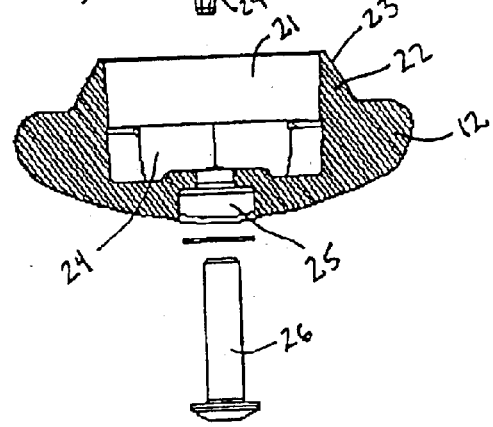
FIG. 4 is a partially exploded sectional view of the arm and swivel of the invention along line A—A of FIG. 1
Figure 5:
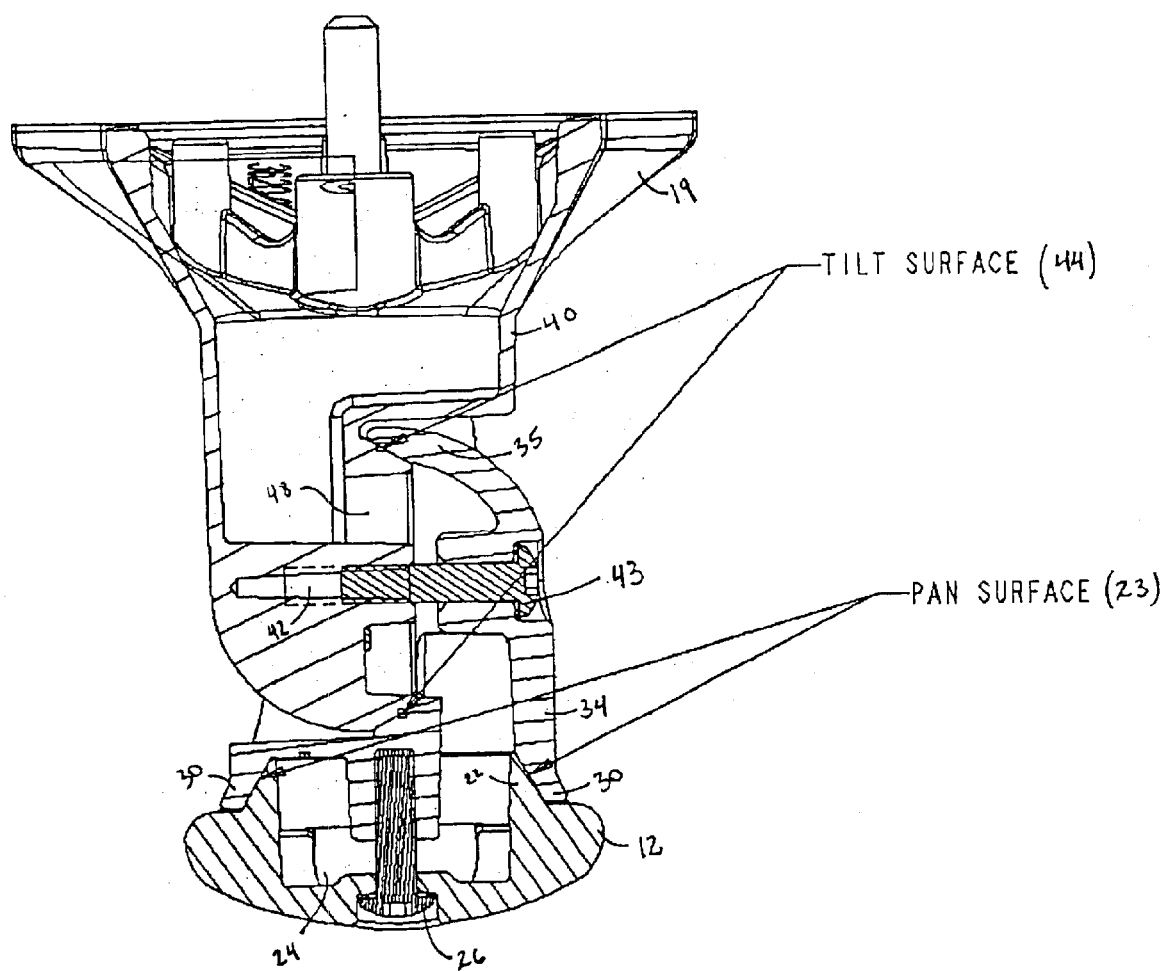
FIG. 5 is a sectional view of the assembled invention along line A—A of FIG. 1

Rotatable member 34 includes a bell-shaped lower journal section 30 having an angled annular interior surface 31 for slidable engagement against surface 23 of socket 21 as shown in FIGS. 4 and 5. A receptacle and opening 29 is provided at the center of journal section 30 for receiving attachment screw 26, which also provides a pivot for rotation of member 34. An open interior area 38 is provided in journal section 30 for receiving one or more wires 15. Journal section 30 is inserted over socket 21 and rotated to a desired location, as surfaces 23 and 31 bear against each other. When the desired position is reached, screw 26 is tightened in order to fix this position. The area of surfaces 23 and 31 is deliberately large to provide sufficient friction to hold a heavy camera in the selected position.

The upper portion of rotatable member 34 includes a hemispherical cup 35 having an axis that is perpendicular to that of bell-shaped journal section 30. The interior of cup 35 includes annular angled bearing surface 36 for receiving a journal member 41 of an upper support. A through hole 45 is provided in the center of cup 35 for receiving an attachment means such as a screw 43. Open interior area 38 opens into cup 35 providing a channel between journal section 30 and cup 35 through which one or more wires 15 may be threaded.

Figure 3:
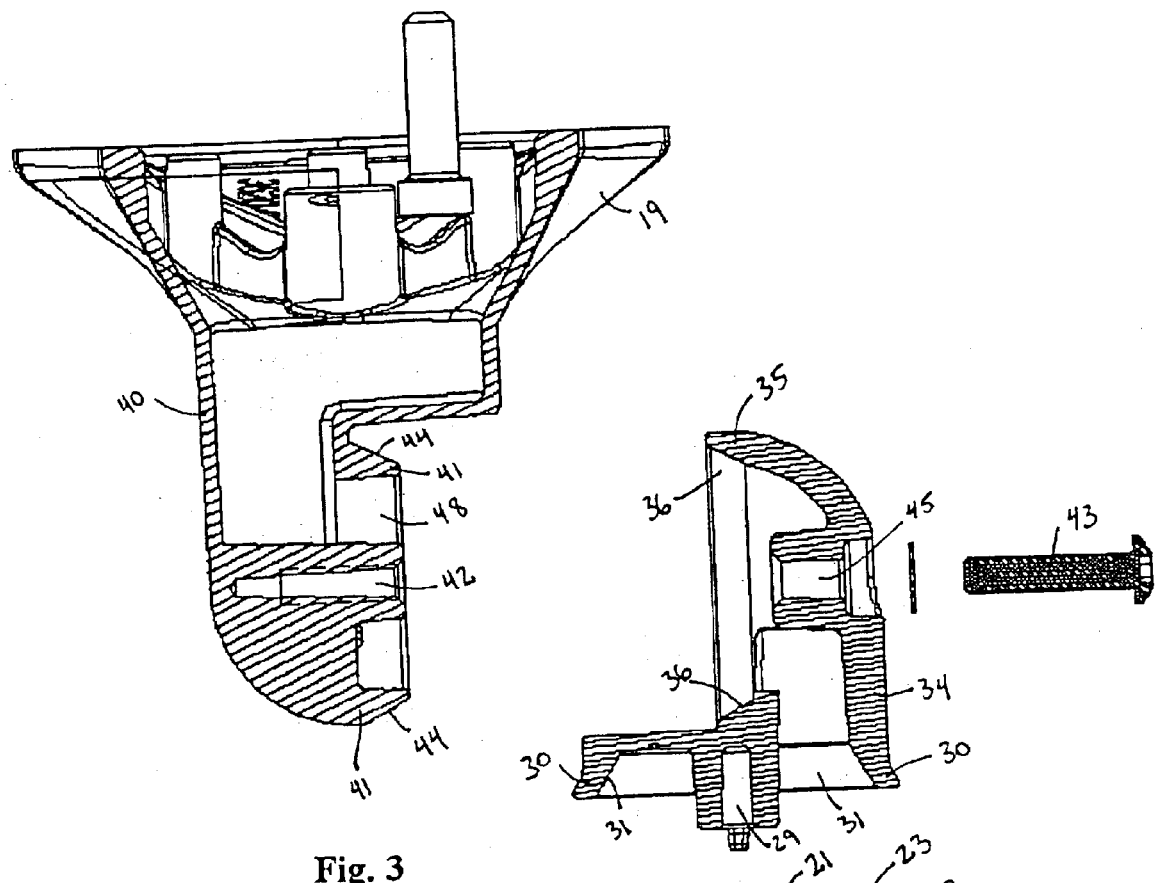
FIG. 3 is a sectional view of the upper portion of the invention along line A—A of FIG. 1

An upper support member 40 is provided for holding the surveillance camera of the system as shown in FIGS. 3 and 5. Support member 40 has a lower journal member 41 in the form of an annular lip having an angled bearing surface 44 for slidable engagement against surface 36 of hemispherical cup 35 of rotatable member 34. An opening 42 is provided at the center of journal member 41 for receiving attachment screw 43 which also serves as a pivot for rotation of journal member 41. An open interior area 48 is provided in journal member 41 for receiving one or more wires 15. Area 48 provides a channel to the interior of upper platform 19 so that wires 15 may be threaded to the camera. See FIG. 7 Journal member 41 is inserted into cup 35 and rotated to a desired location, as surfaces 44 and 36 bear against each other. When the desired position is reached, screw 43 is tightened in order to fix this position. The area of surfaces 44 and 36 is deliberately large to provide sufficient friction to hold a heavy camera in the selected position.

Figure 9:
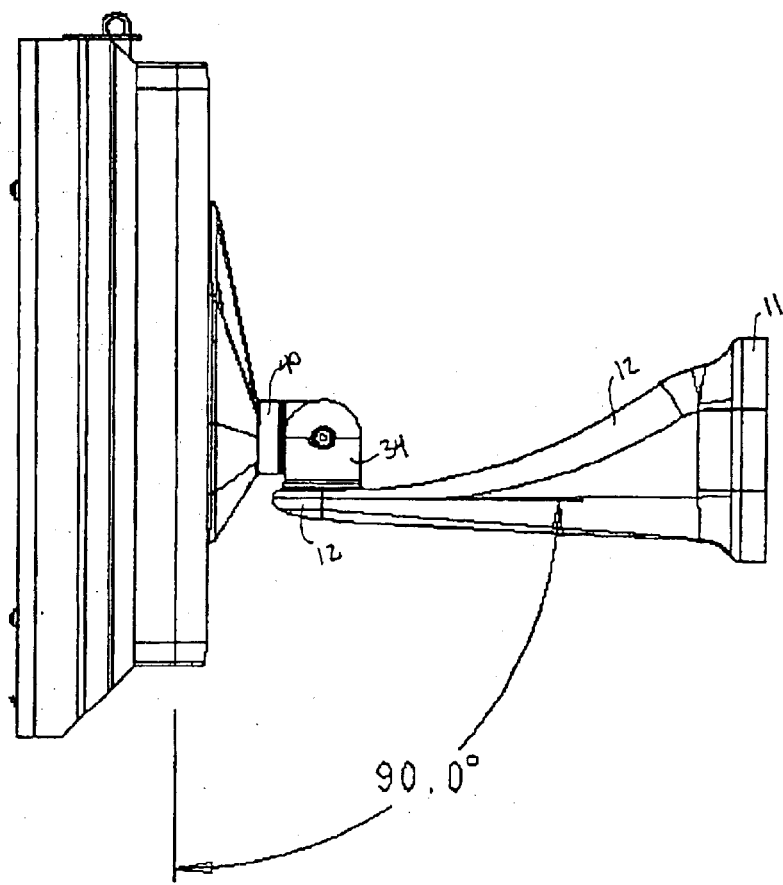
FIG. 9 is a side view of the invention supporting a large camera and enclosure that has been tilted down 90°.
Figure 10:
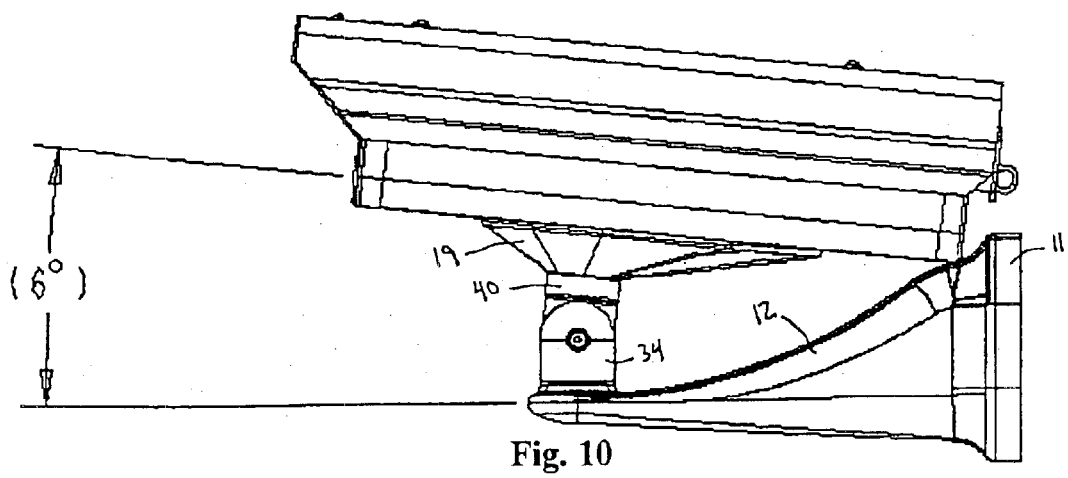
FIG. 10 is a side view of the invention supporting a large camera and enclosure that has been tilted up about 6°.

Some exemplary tilt angles for the camera are illustrated in FIGS. 9 and 10. FIG. 9 shows a camera enclosure 18 tilted straight down, a full 90° from the horizontal axis of the arm 12. FIG. 10 shows the same enclosure tilted upward at about 6°. It is to be appreciated that a large camera enclosure 18 is shown in these illustrations, and that smaller enclosures will allow for a much wider range of tilt angles, up to a full 180°.

Figure 11:
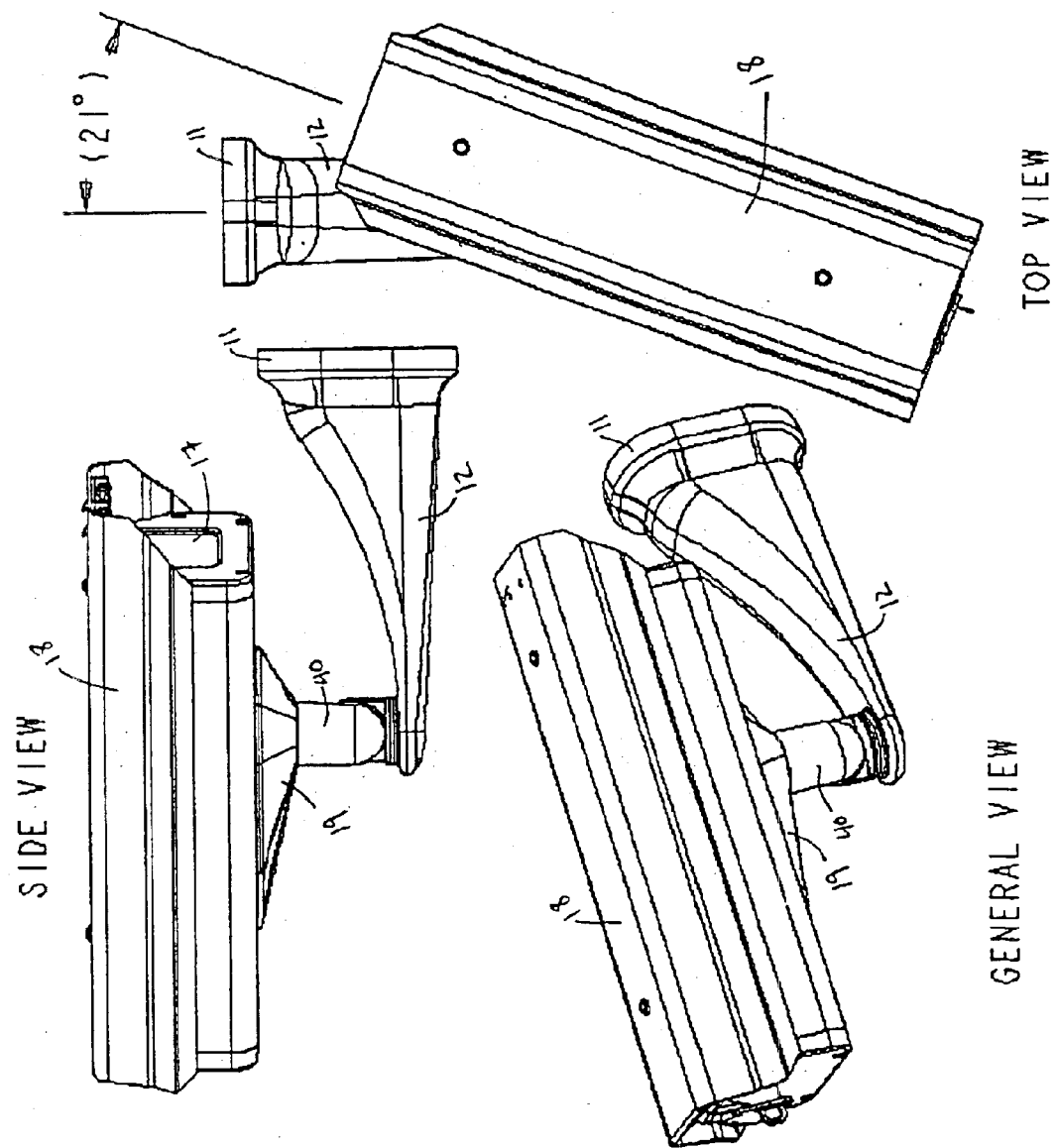
FIG. 11 is a set of three views (side, perspective and top) of the invention supporting a large camera enclosure, each view showing the same camera angle rotated 159° from the front.

FIG. 11 shows a rotation (pan or scan) angle using the same large camera enclosure 18 with viewing window 17. Even with the large enclosure 18 as shown, the counter-clockwise range of rotation is about 159°(180°−21°) from the angle of arm 12. The same range of rotation (about 159°) is available in the clockwise direction, for a full range of well over 300°. Again, it is to be appreciated that a large camera enclosure 18 is shown in FIG. 11, and that smaller enclosures will allow for an even wider range of rotation (pan/scan) angles.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. An adjustable support structure for a surveillance camera comprising a surface mountable base, an elongated arm attached at one end to said base and having a socket at the opposite end, a first rotatable member for adjustable engagement with said socket, a second rotatable member for adjustable engagement with said first rotatable member, and an upper platform attached to said second rotatable member for supporting a surveillance camera wherein said first rotatable member is rotatably adjustable around a first axis, said second rotatable member is adjustably rotatable around a second axis, and an internal channel is provided from said base through said arm and said rotatable members to said platform through which at least one wire may be threaded.

2. The camera support structure of claim 1 wherein a first set screw is provided to fix the position of said first rotatable member relative to said arm, and a second set screw is provided to fix the position of said second rotatable member relative to said first rotatable member.

3. The camera support structure of claim 1 wherein said socket includes an upwardly extending annular lip having an outer angled surface, and said first rotatable member includes a bell-shaped lower journal section having an angled annular interior surface for slidable engagement against the angled surface of said socket.

4. The camera support structure of claim 3 wherein the angled surface of said socket and the interior surface of said journal section each have a large mating area to provide increased friction for holding a heavy camera in a fixed position.

5. The camera support structure of claim 4 wherein said first rotatable member includes an upper hemispherical cup having an axis that is oriented perpendicular to the axis of said bell shaped member, said cup having an interior surface for slidable engagement against a second journal section of said second rotatable member.

6. The camera support structure of claim 5 wherein the interior surface of said cup and said second journal section each have a large mating area to provide increased friction for holding a heavy camera in a fixed position.

7. The camera support structure of claim 6 wherein said first rotatable member is capable of rotating through an arc of about 300 degrees.

8. The camera support structure of claim 7 wherein said second rotatable member is capable of rotating through an arc of about 180 degrees.

9. An adjustable support structure for a surveillance camera comprising a base, an elongated arm attached at one end to said base and having an opposite end, a first rotatable member adjustably engaged with said opposite end, a second rotatable member adjustably engaged with said first rotatable member, and an upper platform attached to said second rotatable member for supporting said surveillance camera wherein said first rotatable member is adjustably rotatable around a first axis, and said second rotatable member is adjustably rotatable around a second axis, and an internal channel is provided from said base through said arm and said rotatable members to said platform through which at least one wire may be inserted.

10. The support structure of claim 9 wherein said first axis is generally perpendicular to said second axis.

11. The support structure of claim 10 wherein said opposite end of said elongated arm includes an upwardly extending annular lip having an outer angled surface.

12. The support structure of claim 11 wherein said first rotatable member includes a bell-shaped lower journal section having an angled annular interior surface for slidable engagement against the angled surface of said opposite end of said elongated arm.

13. The support structure of claim 12 wherein the angled surface of said opposite end of said elongated arm and the interior surface of said journal section each have a large mating area to provide increased friction for holding a heavy camera in a fixed position.

14. The support structure of claim 13 wherein said first rotatable member includes an upper hemispherical cup having an axis that is oriented perpendicular to the axis of said bell shaped member, said cup having an interior surface for slidable engagement against a second journal section of said second rotatable member.

15. The support structure of claim 14 wherein the interior surface of said cup and said second journal section each have a large mating area to provide increased friction for holding a heavy camera in a fixed position.

16. The support structure of claim 10 wherein said first rotatable member is capable of rotating through an arc of about 300 degrees.

17. The support structure of claim 10 wherein said second rotatable member is capable of rotating through an arc of about 180 degrees.

18. An adjustable support structure for a surveillance camera comprising a mounting means, an elongated connecting means attached at one end to said mounting means and having a receiving means at the opposite end, a first rotatable support means for adjustable engagement with said receiving means, a second rotatable support means for adjustable engagement with said first support means, and a second mounting means attached to said second support means for holding said camera wherein said first support means is adjustably rotatable around a first axis, and said second support means is adjustably rotatable around a second axis that is perpendicular to said first axis.

* * * * *